United States Patent [19]

Warsta

[11] Patent Number: 5,713,073
[45] Date of Patent: Jan. 27, 1998

[54] LOCATION UPDATING IN A MOBILE COMMUNICATION SYSTEM

[75] Inventor: Markus Warsta, Kerava, Finland

[73] Assignee: Nokia Telecommunications Oy, Espoo, Finland

[21] Appl. No.: 632,468
[22] PCT Filed: Aug. 23, 1995
[86] PCT No.: PCT/FI95/00449
 § 371 Date: Apr. 23, 1996
 § 102(e) Date: Apr. 23, 1996
[87] PCT Pub. No.: WO96/07277
 PCT Pub. Date: Mar. 7, 1996

[30] Foreign Application Priority Data

Aug. 23, 1994 [FI] Finland ................ 943873

[51] Int. Cl.[6] ............... H04B 1/00; H04B 7/00
[52] U.S. Cl. ............ 455/56.1; 455/54.1; 379/59
[58] Field of Search .......... 455/33.1, 33.4, 455/53.1, 54.1, 54.2, 56.1; 379/59, 60

[56] References Cited

U.S. PATENT DOCUMENTS 5,058,201 10/1991 Ishii et al. .
5,384,824 1/1995 Alvesalo .................... 376/59
5,396,543 3/1995 Beeson, Jr. et al. ........... 379/60
5,479,481 12/1995 Koivunen .................... 379/59
5,537,610 7/1996 Mauger et al. ............... 455/54.1

FOREIGN PATENT DOCUMENTS 0 574 988 12/1993 European Pat. Off. .
95/11577 4/1995 WIPO .

*Primary Examiner*—Curtis Kuntz
*Assistant Examiner*—Sam Bhattacharya
*Attorney, Agent, or Firm*—Cushman Darby & Cushman Intellectual Property Group of Pillsbury Madison & Sutro LLP

[57] ABSTRACT

Location updating is provided in a mobile communication system which visitor location registers, each of which maintains the subscriber and location data of mobile subscribers visiting its service. In addition, there are sub-location registers for a particular sub-area of the service area of a visitor location register. A sub-location register is arranged to forward the first location updating of a mobile station arriving into the sub-area to the visitor location register to the service area of which the sub-area belongs, in order to update the location data of the visitor location register and to copy the necessary subscriber data from the visitor location register to the sub-location register. The sub-location register is also arranged to independently handle the subsequent location updatings of the mobile station in the sub-area in such a manner that the location of the mobile station is updated only in the sub-location register.

15 Claims, 3 Drawing Sheets

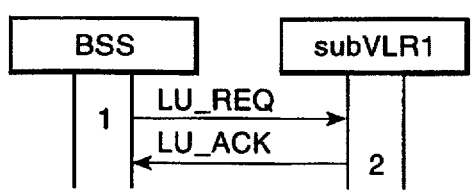
Fig. 4A
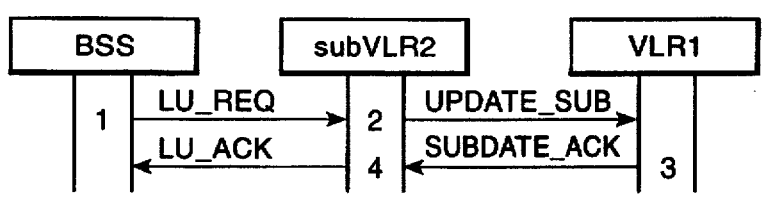
Fig. 4B
Fig. 4C
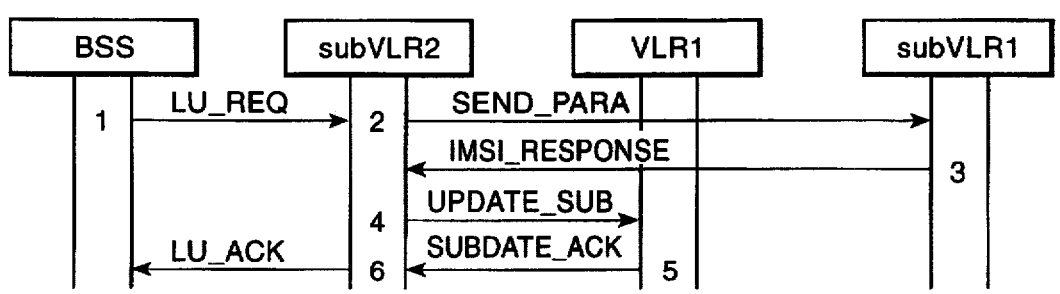
Fig. 4D
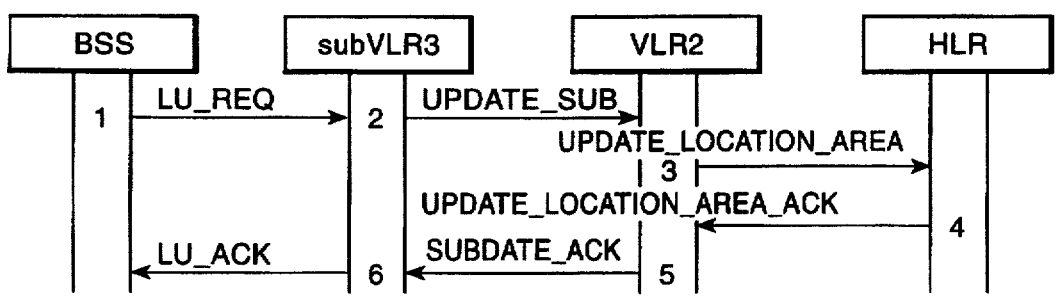
Fig. 4E
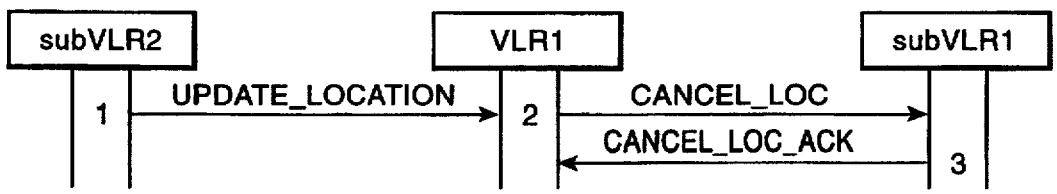

ration PCT/FI95/00449, filed Aug. 23, 1995.

LOCATION UPDATING IN A MOBILE COMMUNICATION SYSTEM

This application claims benefit of international application PCT/FI95/00449, filed Aug. 23, 1995.

BACKGROUND OF THE INVENTION

The present invention relates to a mobile communication system comprising mobile stations, base stations, base station controllers, mobile exchanges, and visitor location registers, each of said visitor location registers maintaining the subscriber and location data of mobile subscribers visiting its service area, and a sub-location register for a particular sub-area in the service area of at least one visitor location register, the mobile stations being arranged to perform a location updating when moving from one location area into another.

As is well known, the geographical area covered by cellular communication and mobile telephone systems is divided, in order that the frequency spectrum can be used more efficiently, into smaller radio areas, i.e. cells, in which mobile stations may freely move. Mobile communication systems maintain special registers, which store data on the current location of a mobile station. For mobile terminating call routing, each mobile station must have a so-called home location register in the mobile communication network for maintaining information on the location of the mobile station with a certain accuracy. In addition, mobile communication networks comprise visitor location registers, which contain all the location, etc., data of mobile stations located (visiting) in the area managed by the visitor location register. The service area of the visitor location register is further geographically divided into location areas, each consisting of one or more cells. Each mobile station is always located in one of the location areas in a mobile communication network. The location area information broadcast by a base station indicates to the mobile station which location area the base station and the cell belong to. When moving from a base station (cell) area to another, the mobile station compares the location area identifier of the new base station with the location area identifier of the previous base station stored in its memory, and if the location area identifiers of the base stations differ from each other, the mobile station performs a so-called location updating to the mobile communication network. This is done by updating the location data of the mobile station in the visitor location register. If the visitor location register also changes, the new visitor location register reports to the home location register, which stores information on the new visitor location register to the mobile station location data to route mobile terminating calls. If the mobile station moves from one cell into another within the same location area, the location area identifier does not change, and no location updating to the mobile communication network is required.

In present-day mobile communication systems, location registers are hierarchically equal by nature: one visitor location register for one geographical area. As the number of subscribers increases, the number of visitor location registers has to be increased (for instance, one visitor location register per 100,000 subscribers). In big cities, the number of subscribers can be expected to amount to millions, which means tens of visitor location registers. Location updating traffic will thus constitute a significant part of the load of a mobile communication network and will be an important factor affecting the design of mobile communication network capacity. The traffic load of home location registers increases correspondingly along with the number of visitor location registers and subscribers changing location between them.

A location area also constitutes the smallest paging area, which is also a criterion for designing a mobile communication network. Reducing the size of a geographical paging area also reduces paging traffic but correspondingly increases location updating traffic. For instance, further development of the present-day mobile communication systems has brought out services in which a paging area smaller than the one used today would be advantageous, but the location updating load caused by it to the present-day mobile communication systems prevents the reduction of the size of paging areas in practice.

European Patent Application 462,728 discloses a mobile communication system, wherein part of the functions of a mobile exchange and a visitor location register have been assigned to a base station controller in such a manner that the base station controller is able to directly switch inexpensive local calls between mobile stations and a public-switched telephone network PSTN without a call being routed via the actual mobile exchange. This allows the implementation of different, inexpensive local calls. The intelligent base station controller is provided with a so-called slave location register, into which is copied certain data from the actual visitor location register. All functions relating to location management and location updating are however still located in the mobile exchange and the actual visitor location register. The intelligent base station controller does not thus save handling capacity at all in the visitor location register, and it only saves transmission channel capacity in the mobile exchange in the case of local calls.

SUMMARY OF THE INVENTION

The object of the present invention is to provide a mobile communication system and a location updating method which level location updating load in a mobile communication network, and especially reduce the restriction of capacity caused by location updating traffic in visitor location registers.

This is achieved with the mobile communication system described in the foregoing BACKGROUND section, characterized according to the invention in that the sub-location register is arranged to forward a first location updating of a mobile station arriving into a particular sub-area to the visitor location register to the service area of which that sub-area belongs, in order to update the location data in the visitor location register and to copy necessary subscriber data from the visitor location register to the sub-location register, and that the sub-location register is arranged to independently handle the subsequent location updatings of the mobile station within the sub-area in such a manner that the location of the mobile station is updated only in the sub-location register.

The invention also relates to a location updating method in a mobile communication system comprising mobile stations, base stations, base station controllers, mobile exchanges, and visitor location registers, each of said visitor location registers maintaining the subscriber and location data of mobile subscribers visiting its area, and a sub-location register for a particular sub-area in the service area of at least one visitor location register, in which method a mobile station performs a location updating when moving from one location area into another. The method is characterized according to the invention by directing location updatings arriving from the particular sub-area to the sub-location register, forwarding the first location updating of the mobile station in the sub-area further to the visitor location register to the service area of which the sub-area belongs, updating the visitor location register and copying necessary subscriber data from the visitor location register to the sub-location register, and handling the subsequent location updatings of the mobile station in the sub-area in such a manner that the location of the mobile station is updated only in the sub-location register.

In the invention, the hierarchy of the mobile communication network is supplemented with one new location register, i.e. a sub-location register, which reduces the load directed to the actual location register, i.e. the visitor location register, and thus increases the capacity of the visitor location register and the mobile exchange associated with it in this respect. The sub-location register is located between the mobile exchange and the base station in the network hierarchy, for instance in association with the base station controller. When a mobile station moves into a new location area in the system of the invention, it initiates a location updating in the normal manner. If the location updating concerned is the first location updating into the sub-location register, the sub-location register does not recognize the mobile station, whereby the location updating is forwarded to occur in the normal manner in the visitor location register at a higher level in the hierarchy. The sub-location register copies the necessary mobile subscriber data from the visitor location register into its own database and stores the data on the location area of the mobile station. When the mobile station changes the location area for the next time within the area of the same sub-location register, the new location updating is performed only in the sub-location register, i.e. as regards the actual visitor location register, the mobile phone is still within the same location area. A mobile terminating call is set up quite normally as regards the visitor location register, the only difference is that the call message is transferred via the sub-location register, which focuses the location area into which the paging is transmitted to be correct.

By means of the invention, it is possible to essentially shift the location updating load from a visitor location register to sub-location registers situated hierarchically lower in such a manner that a location updating in a visitor location register is only performed when a mobile station moves from a sub-location register into another. Location updating traffic can be reduced even to a tenth of what it would otherwise be, and thus the number of subscribers handled by one visitor location register/mobile exchange pair can be increased. Since the invention mainly aims at levelling location updating traffic between different network elements, the sub-location register does not have to and should not perform all tasks of the visitor location register but it can especially concentrate on tasks relating to location updating. The sub-location register can however also handle all those procedures in which location area data is required. Therefore, mobile station paging could typically also be included in the tasks of the sub-location register. Likewise, the authentication of a mobile subscriber and possibly the allocation of a temporary mobile subscriber identity can also be part of the location updating carried out in the sub-location register, depending on the mobile communication network configuration.

BRIEF DESCRIPTION OF THE DRAWINGS

In the following, the invention will be described in more detail by means of preferred embodiments with reference to the accompanying drawing, in which:

FIGS. 4A, 4B, 4C, 4D and 4E are signalling diagrams illustrating different location updating events in the mobile communication system of the invention.

Figure 1:
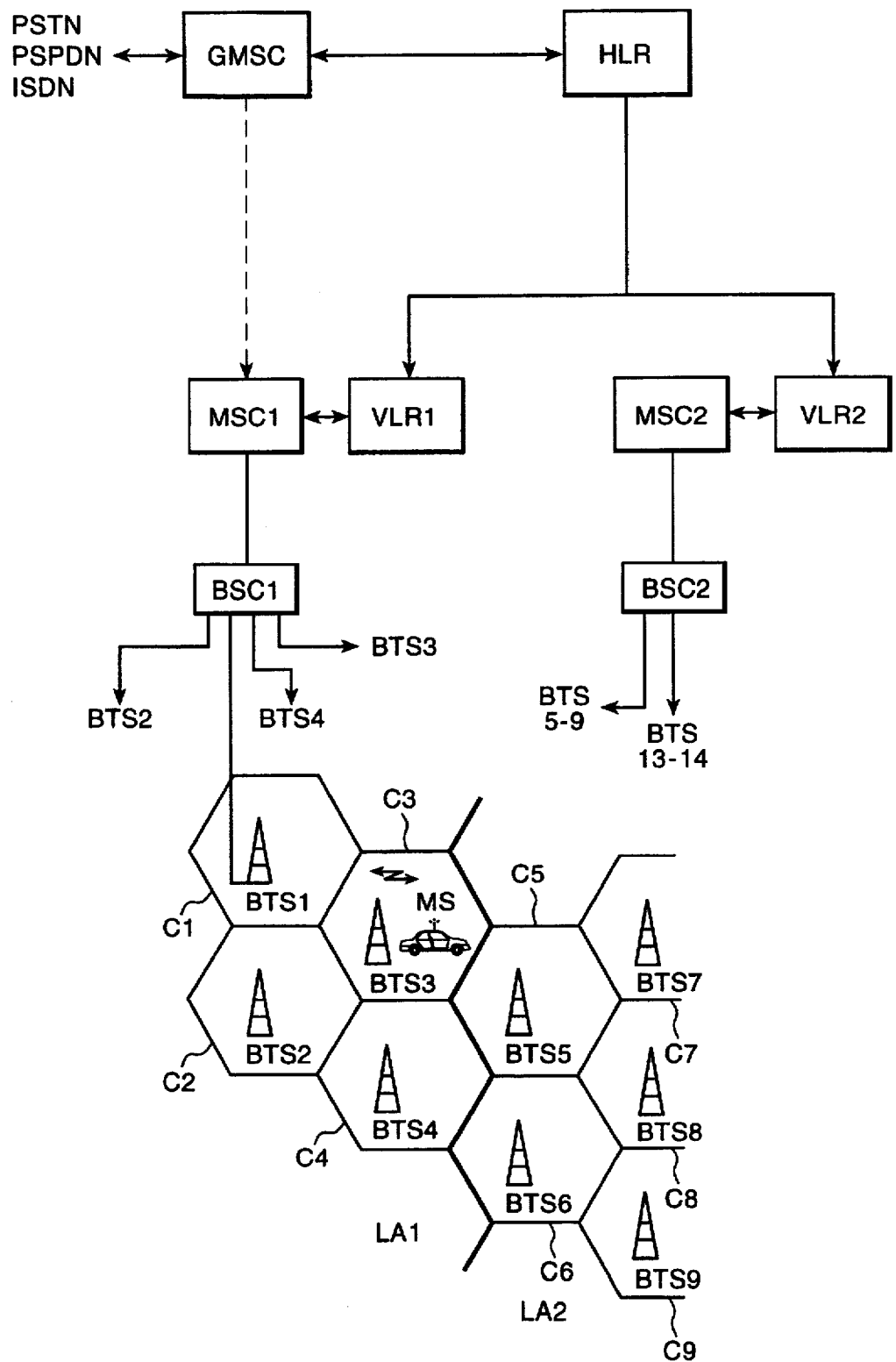
FIG. 1 shows a prior art mobile communication system.

In principle, the present invention can be applied in any mobile communication system, such as the digital pan-European mobile communication system GSM (Global System for Mobile Communications), NMT (Nordic Mobile Telephone), DCS1800 (Digital Communication System), PCN (Personal Communication Network), UMC (Universal Mobile Communication), UMTS (Universal Mobile Telecommunication System), FPLMTS (Future Public Land Mobile Telecommunication System), etc.

As is well known, the geographical area covered by the network in mobile communication networks is divided into smaller radio areas, i.e. cells, in such a manner that while in a cell, a mobile radio station, i.e. a mobile station MS, communicates with a fixed network via a fixed radio station, i.e. a base station BTS, located in the cell. Mobile stations MS may freely move from a cell into another. However, the mobile communication network must know the location of the mobile station MS in order to be able to route mobile terminating calls to the mobile station or to page it for some other reason. Usually, a mobile communication network knows the location of a mobile station with an accuracy of an area consisting of one or more cells, that area being generally referred to as a location area.

The base stations BTS of a cellular network constantly broadcast information on themselves and their neighborhood, such as location area identifiers LAI, base station identifiers BSI, base station type identifiers BSTI, and so-called neighboring cell information. An MS registered in a cell knows which location area the base station BTS belongs to on the basis of the location area identifier LAI broadcast by the base station BTS. If the MS observes that the location area identifier LAI also changes as it changes the base station BTS, i.e. that the location area changes, the MS initiates a location updating by transmitting a location updating request to the cellular communication network. If the location area does not change, no location updating is carried out by the MS.

A location updating causes the subscriber data of the respective MS to be updated in the subscriber databases of the cellular communication network. For instance, the GSM system illustrated as an example in FIG. 1 comprises at least a home location register HLR, visitor location registers VLR, mobile exchanges MSC, and base station controllers BSC, which together with the base stations BTS connected thereto constitute base station systems BSS. The location area data of the MS is stored in a visitor location register VLR, there being typically one visitor location register for each mobile exchange MSC. A home location register HLR permanently stores subscriber data and knows the VLR within the area of which the mobile station MS is currently located. The structure and operation of the GSM system are further described in GSM specifications and in "The GSM system for Mobile Communications", M. Mouly & M. Pautet, Palaiseau, France, 1992, ISBN: 2-9507190-0-0-7.

For the sake of clarity, FIG. 1 shows only two location areas LA1 and LA2, the former being included in the area of a mobile exchange MSC1 and the latter in the area of a mobile exchange MSC2. The location area LA1 comprises for instance cells C1–C4, which comprise base stations BTS1–BTS4, respectively. As for LA2, it comprises for instance cells C5–C9, which comprise base stations BTS5–BTS9, respectively. In a cell, a mobile station MS establishes a bidirectional radio connection with the base station BTS of that cell. The traffic in the location areas LA1 and LA2 is controlled by base station controllers BSC1 and BSC2, respectively. Conventionally, all location updatings are performed into a visitor location register VLR, which significantly consumes the handling capacity of each MSC/VLR pair, thus restricting for instance the maximum number of subscribers.

Figure 2:
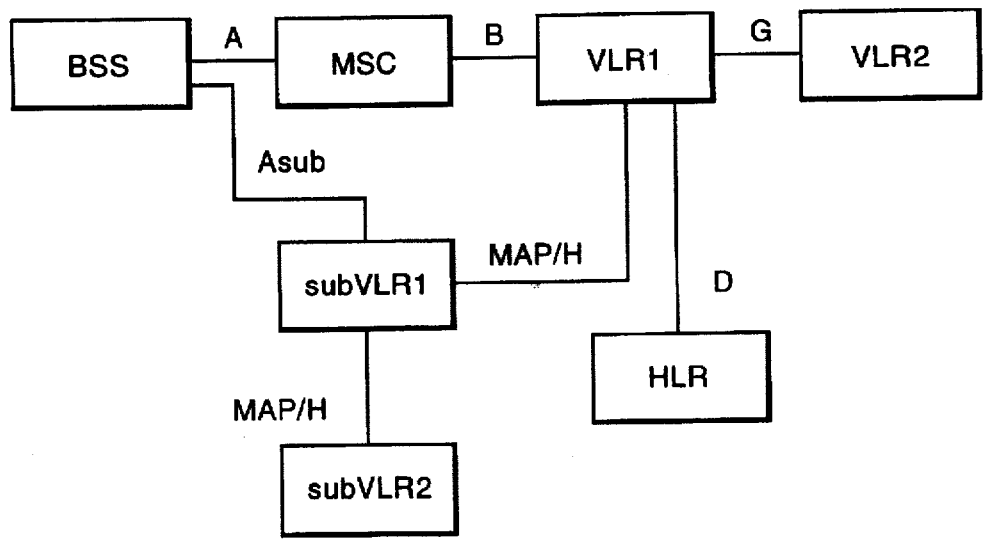
FIG. 2 illustrates a mobile communication system according to the invention.

FIG. 2 shows a schematic diagram of the mobile communication system of the invention, supplemented with one hierarchically lower location register level. To be more specific, the mobile communication system is provided with one or more new location registers, which are hierarchically situated between a mobile exchange MSC and a base station BTS, for instance in association with a base station controller BSC. Below, this new location register will be referred to as a sub-location register subVLR. In FIG. 2, the subVLR is connected by means of a new interface Asub to the base station system BSS, preferably to the base station controller BSC, and by means of another new interface MAP/H to the visitor location register VLR a sub-area belonging to the service area of which it serves. The sub-location register subVLR may further have a third interface MAP/I with one or more other sub-location registers subVLR. In addition, the mobile communication system of the invention comprises all normal network elements and connections between them. In other words, the base station system BSS is connected by an interface A to the mobile exchange MSC, which is connected via an interface B to the visitor location register VLR associated with it, this register being connected to the home location register HLR via an interface D. Furthermore, the visitor location register VLR may be directly connected to another visitor location register VLR via an interface G.

The basic structure of a sub-location register subVLR may be similar to that of an actual visitor location register VLR. Since the main purpose of the sub-location register subVLR is to shift location updating traffic from the actual visitor location register VLR, the subVLR need not perform all tasks of the visitor location register VLR, but it can concentrate on tasks relating especially to location updating. The subVLR also preferably handles all those procedures in which location area data is required. Therefore, the subVLR also preferably performs the paging of a mobile station. Likewise, the authentication of a mobile subscriber and the allocation of a temporary mobile subscriber identity TMSI can also be part of the location updating, depending on the mobile communication network configuration. The sub-location register subVLR preferably constitutes a pair with a base station controller BSC similar to that constituted by the actual visitor location register VLR with a mobile exchange MSC. The subVLR performs location management within a certain part of the geographical service area of the VRL. This sub-area may be for instance an area covered by one base station system BSS, but it can be determined in a manner suitable in each particular case according to the required increase in capacity. The service area of one visitor location register VLR may comprise one, several or no sub-location registers subVLR, depending on the location updating load.

Figure 3:
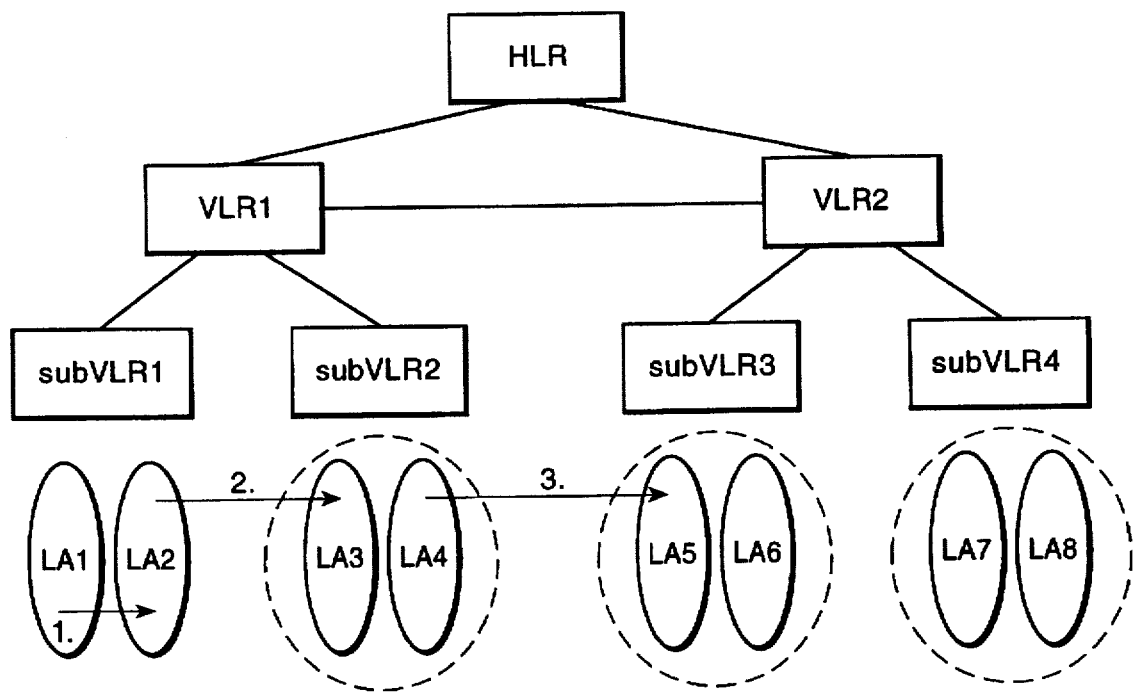
FIG. 3 illustrates the location registers of different hierarchical levels in the mobile communication system of the invention, and different location updating events when a mobile station moves in the network.

In the following, the operation of the mobile communication system of the invention will be described in more detail with reference to FIG. 3. FIG. 3 shows the three hierarchical levels of the location registers of the mobile communication system of the invention, i.e a home location register HLR, visitor location registers VLR1 and VLR2, and below VLR1 and VLR2, sub-location registers subVLR1 and subVLR2, and subVLR3 and subVLR4, respectively. The sub-location registers subVLR1 and subVLR2 control sub-areas of the service area of the visitor location register VLR1, these sub-areas covering location areas LA1 and LA2, and LA3 and LA4, respectively. The sub-location registers subVLR3 and subVLR4 control sub-areas of the service area of the visitor location register VLR2, these sub-areas covering location areas LA5 and LA6, and LA7 and LA8, respectively.

At the general level, the mobile communication system of the invention operates in the following manner. When a mobile station MS performs a location updating for the first time to one of the location areas under a sub-location register subVLR, that mobile station MS initiates a normal location updating by transmitting a location updating request, which is forwarded via the base station system BSS to the sub-location register subVLR. Since the mobile station MS is a new subscriber, the subVLR does not recognize the mobile station MS, whereby the location updating is forwarded further to the visitor location register VLR a part of the service area of which the subVLR serves, and either the identifier of the sub-location register subVLR or the identifier of the location area from which the first location updating is performed is updated into the visitor location register VLR. Furthermore, the subVLR copies the necessary subscriber data from the visitor location register VLR into its own database and stores the location area data of the mobile station MS. The next time the mobile station MS changes location area within the area of the same sub-location register subVLR, the new location area is updated only in the subVLR, and no location updating is performed in the actual visitor location register VLR. In other words, as regards the actual VLR, the mobile station MS is still located in the same location area. A mobile terminating call to the mobile station MS is set up quite normally as regards the VLR, the only difference is that the call message is routed via the subVLR, which defines the location area more accurately. In practice, this may be carried out in such a manner that the MSC, which receives the mobile terminating call, requests subscriber data from the VLR associated with it, that VLR providing either the identifier of the sub-location register subVLR or the location area identifier obtained during the first location updating. The MSC transmits a normal paging message to the base station system BSS, as a result of which the base station system BSS performs a new interrogation to the sub-location register subVLR. The subVLR provides the base station system BSS with an updated location area identifier, on the basis of which the base station system BSS completes the paging of the mobile station MS.

In the mobile communication system of FIG. 3, location updating may be divided into the following cases:

1) Both location areas LA are included within one sub-VLR. The location data thus remains in the same subVLR, and the higher-level VLR is not aware of the location updating.

2) The new location area LA belongs to a new subVLR but to the current VLR. In such a case, the actual location updating is performed into the subVLR, but the information on which subVLR the location data of the mobile station MS is situated in should be updated into the actual VLR.

3) The new location area LA belongs to both a new subVLR and a new VLR. Thus, in addition to case 2), the information on the VLR within the area of which the mobile station MS is situated should also be updated into the home location register HLR.

The signalling relating to these different cases of location updating will be described in the following with reference to FIG. 3 and FIGS. 4A–4E.

FIG. 4A shows a case where a mobile station MS moves in the direction of arrow 1 from a location area LA1 into a location area LA2 within the area of a sub-location register subVLR1. Since the MS remains within the area of the same subVLR1 a location updating is performed only into the dedicated subVLR1. With reference to FIG. 4A, the base station controller BSC which has received a location updating message LU_REQ from the mobile station MS from the location area LA2, forwards the message to the sub-location register subVLR1. The subVLR1 updates the identifier of the location area LA2 as the location data of the MS, and transmits an acknowledgement message LU_ACK in the reverse direction.

FIG. 4B shows a case where a mobile station MS in FIG. 3 moves, in the direction of arrow 2, from the location area LA2 of the sub-location register subVLR1 into the location area LA3 of the sub-location register subVLR2 within the service area of the same visitor location register VLR1. Since the new location area LA3 is within the area of a new subVLR2, the higher-level visitor location register VLR1 must update the identifier of the subVLR2. With reference to FIG. 4B, the base station system BSS which receives the location updating message LU_REQ of the mobile station MS from the location area LA3 forwards the message to the sub-location register subVLR2. The subVLR2 does not recognize the new subscriber but forwards the location updating further to the actual visitor location register VLR1 by means of a location updating message UPDATE_SUB. The VLR1 updates either the identifier of the subVLR2 or the identifier of the location area LA3 as the location data of the mobile station, and acknowledges the location updating by transmitting a message SUBDATE_ACK to the subVLR2. The subVLR2 then transmits an acknowledgement LU_ACK to the base station system BSS. In addition, the subVLR2 copies the necessary data of the mobile station MS from the VLR1.

For security reasons, it is possible to use a temporary mobile subscriber identity TSMI instead of the actual mobile subscriber identity IMSI on the radio path in a mobile communication system. In the mobile communication system according to the invention, there are two possibilities for reallocating the TMSI:

1) a subVLR allocates the TMSI independently, or 2) a VLR allocates the TMSI and a subVLR forwards and stores it, when the reallocation of the TMSI is carried out in connection with location updating. The solution used depends on the capacity requirement of the VLR.

If, in the case of FIG. 4B, the mobile station MS has identified itself by means of an identity TMSI in the location updating message LU_REQ, the subVLR is not able to carry out the authentication of the MS until the actual IMSI is fetched either from the previous subVLR or the mobile station MS. The signalling in FIG. 4B can thus be modified according to FIG. 4C, in which the subVLR2 requests of the VLR1 and the VLR1 further requests of the previous sub-location register subVLR1 the identity IMSI by means of a message SEND_PARA. The subVLR1 returns the IMSI in a message IMSI_RESPONSE to the new sub-location register subVLR2, whereafter location updatings and acknowledgements are performed in the subVLR2 and the VLR1 in the manner shown in FIG. 4B. A TMSI can be fetched correspondingly also in the cases of FIGS. 4A and 4D, even though this is not separately shown.

FIG. 4D shows a case where a mobile station MS in FIG. 3 moves, in the direction of arrow 3, from the location area LA4 to the location area LA5. Since the new location area LA5 is entirely under the new higher-level visitor location register VLR2, location updating should also be performed in the home location register HLR. The base station system BSS forwards the location updating message LU_REQ, which it receives from the mobile station MS in the location area LA5, further to a sub-location register subVLR3. Since the MS is a new subscriber, the subVLR3 does not recognize it but transfers the location updating to the actual visitor location register VLR2 by a message UPDATE_SUB. Since the MS is a new subscriber also in the visitor location register VLR2, the VLR2 performs a location updating in the home location register HLR of the mobile station MS by a message UPDATE_LOCATION_AREA with the address of the home location register HLR, and acknowledges the location updating with a message UPDATE_LOCATION_AREA_ACK. In this connection, the necessary subscriber data of the mobile station MS is copied from the home location register HLR into the visitor location register VLR2. The VLR2 stores the identifier of the sub-location register subVLR3 or the identifier of the location area LA5 as the location data of the mobile station MS, and acknowledges the location updating with a message SUBDATE_ACK. In this connection, the necessary data of the mobile station MS is copied from the visitor location register VLR2 to the sub-location register subVLR3. The subVLR3 stores the location area identifier LA5 to the location data of the mobile station MS, and acknowledges the location updating with a message LU_ACK.

FIG. 4E shows the removal of the previous location data in the location updating case of FIG. 4B. Thus, the VLR1, which receives a location updating from the new sub-location register subVLR2, removes the previous location from the previous sub-location register subVLR1 by transmitting a message CANCEL_LOC. The subVLR1 thus removes the subscriber data of the mobile station MS from its database and transmits an acknowledgement CANCEL_LOC_ACK to the visitor location register VLR1.

The figures and the description relating thereto are merely intended to illustrate the present invention. In their details, the mobile communication system and location updating method of the invention may vary within the scope of the appended claims.

I claim:

1. A mobile communication system, comprising:

a plurality of mobile stations;

a plurality of base stations;

a plurality of base station controllers;

a plurality of mobile exchanges;

a plurality of visitor location registers for respective service areas which are divided into location areas; each of said visitor location registers maintaining subscriber and location data of mobile subscribers visiting its respective service area;

a plurality of mobile stations arranged to perform a location updating when moving from any one location area into another location area, of said location areas;

at least one sub-location register for a particular sub-area in the service area of at least one said visitor location register;

said sub-location register being arranged to forward a first location updating of a said mobile station, made upon arriving into said sub-area, to the visitor location register of the service area of which said sub-area belongs, in order to update location data in the respective visitor location register and to copy at least some subscriber data from the respective visitor location register to said sub-location register; and said sub-location register being arranged to independently handle the location updatings of the respective mobile station within said sub-area subsequent to said first location updating, in such a manner that the location of the respective mobile station is updated only in said sub-location register.

2. The mobile communication system according to claim 1, wherein:

the subscriber and location data stored in the respective visitor location register is an identifier of the respective sub-location register or a location area identifier obtained in connection with said first location updating.

3. The mobile communication system according to claim 2, wherein:

said sub-location register is arranged to direct a paging message arriving from the respective visitor location register to the current location area of the respective mobile station, said paging message containing the location area identifier obtained in connection with said first location updating.

4. The mobile communication system according to claim 1, wherein:

said sub-location register is connected to a said base station controller via a first interface, to the respective visitor location register via a second interface, and to another sub-location register via a third interface.

5. A location updating method in a mobile communication system having a plurality of mobile stations, a plurality of base stations, a plurality of base station controllers, a plurality of mobile exchanges, and a plurality of visitor location registers for respective service areas which are divided into location areas, each of said visitor location registers maintaining subscriber and location data of mobile subscribers visiting its respective service area, and at least one sub-location register for a particular sub-area in a respective said service area of at least one respective said visitor location register, said method comprising the steps of:

performing by a said mobile station of a location updating when moving from one said location area into another said location area;

directing location updatings arriving from said particular sub-area to the respective said sub-location register;

forwarding a first location updating of said mobile station in said particular sub-area further to the respective said visitor location register to the respective said service area to which said sub-area belongs;

updating the respective said visitor location register and copying at least some subscriber data from the respective said visitor location register to said sub-location register; and handling subsequent location updatings of said mobile station in said sub-area in such a manner that the location of said mobile station is updated only in said sub-location register.

6. The method according to claim 5, further comprising:

storing an identifier of said sub-location register of a location area identifier obtained in connection with said first location updating as location data for said mobile station in said visitor location register.

7. The method according to claim 6, further comprising:

said mobile station moving from one location area into another, new location area within the sub-area of said sub-location register; and updating the location area identifier of said new location area into said sub-location register as location data for said mobile station in said visitor location register.

8. The method according to claim 5, further comprising:

said mobile station moving from a location area of a first said sub-location register into a location area of a second, new said sub-location register within the respective said service area of a same said visitor location register;

updating the location area identifier of said new location area into said second sub-location register as location data of said mobile station, updating the location area identifier of said second sub-location register or the location area identifier of said new location area into the respective said visitor location register as location data of said mobile station.

9. The method according to claim 5, further comprising:

said mobile station moving from a location area of a first said sub-location register of a first said visitor location register, into a new location area, of a second said sub-location register of a second said visitor location register;

storing an identifier of said new location area into said second sub-location register as location data of said mobile station, storing the location area identifier of said second sub-location register or the locations area identifier of said second location area into said second visitor location register as location data of said mobile station;

updating the location area identifier of said second visitor location register into a home location register as location data of said mobile station.

10. The method according to claim 5, further including:

using a temporary mobile subscriber identity for said mobile station on a radio path, instead of an actual mobile station identity for said mobile radio station;

storing information of correlation between said temporary mobile subscriber identity and said actual mobile station identity in a new said sub-location register;

fetching said actual mobile station identity from a previous said sub-location register applicable to said mobile station by referring to said temporary mobile station identity when a first location updating is performed into said new sub-location register.

11. The method according to claim 10, further comprising one of:

performing reallocation of said temporary mobile station identity in the respective said sub-location register, and performing reallocation of said temporary mobile station identity in the respective said visitor location register, and forwarding the thus-allocated temporary mobile station identity to the respective said sub-location register.

12. The method according to claim 5, further including:

performing authentication of a mobile subscriber in a respective said sub-location register in connection with performing a location updating in regard to said mobile station.

13. The method according to claim 5, further comprising:
directing call messages of said mobile station to a respective said location area indicated by location data for said mobile station as stored in the respective said sub-location register.

14. A mobile communication system, comprising:
a plurality of mobile stations;
a plurality of base stations;
a plurality of base station controllers;
a plurality of mobile exchanges;
a plurality of visitor location registers for respective service areas which are divided into location areas; each of said visitor location registers maintaining subscriber and location data of mobile subscribers visiting its respective service area;
a plurality of mobile stations arranged to perform a location updating when moving from any one location area into another location area, of said location areas,
at least one sub-location register for a particular sub-area in the service area of at least one said visitor location register; said sub-location register being connected to a said base station controller via a first interface and to said visitor location register via a second interface;
said sub-location register being arranged to forward a first location updating of a said mobile station, made upon arriving into said sub-area, to the visitor location register of the service area of which said sub-area belongs, in order to update location data in the respective visitor location register and to copy at least some subscriber data from the respective visitor location register to said sub-location register; and
said sub-location register being arranged to independently handle the location updatings of the respective mobile station within said sub-area subsequent to said first location updating, in such a manner that the location of the respective mobile station is updated only in said sub-location register.

15. A location updating method in a mobile communication system having a plurality of mobile stations, a plurality of base stations, a plurality of base station controllers, a plurality of mobile exchanges, and a plurality of visitor location registers for respective service areas which are divided into location areas, each of said visitor location registers maintaining subscriber and location data of mobile subscribers visiting its respective service area, and at least one sub-location register for a particular sub-area in a respective said service area of at least one respective said visitor location register, said sub-location register being connected to a respective said base station controller via a first interface and to a respective said visitor location register via a second interface, said method comprising the steps of:
performing by a said mobile station of a location updating when moving from one said location area into another said location area;
directing location updatings arriving from said particular sub-area to the respective said sub-location register;
forwarding a first location updating of said mobile station in said particular sub-area further to the respective said visitor location register to the respective said service area to which said sub-area belongs;
updating the respective said visitor location register and copying at least some subscriber data from the respective said visitor location register to said sub-location register; and
handling subsequent location updatings of said mobile station in said sub-area in such a manner that the location of said mobile station is updated only in said sub-location register.

* * * * *